United States Patent Office 3,219,409
Patented Nov. 23, 1965

3,219,409
RECOVERY OF IODINE FROM AQUEOUS
SOLUTIONS
Delman R. Asher, Midland, Mich., assignor to The Dow Chemical Company, Midland, Mich., a corporation of Delaware
No Drawing. Filed Feb. 5, 1962, Ser. No. 171,252
3 Claims. (Cl. 23—89)

This invention concerns the recovery of iodine from an aqueous solution of elemental iodine.

Although it is known that some organic solvents have high affinities for elemental iodine, conventional liquid-liquid extraction has not been utilized for the recovery of iodine from an aqueous solution.

It is the primary object of this invention to make possible a stationary gel-phase liquid extraction process whereby iodine in the elemental form may be removed from its aqueous solutions.

Another object of this invention is the recovery of iodine as iodide by removing it in elemental form from aqueous solution by means of a stationary gel-phase liquid extraction process and thereafter stripping the iodine as iodide from such gel phase by elution with a chemical solvent for iodine, e.g., aqueous caustic soda or aqueous sodium thiosulfate.

Other objects of this invention will be apparent from a further study of the specification.

The process of this invention uses as an extractant of elemental iodine particulate resin beads which are in a swollen or gel form, i.e., swollen with Tetralin 1,2,3,4-tetrahydronaphthalene. The beads are of the polymeric vinylaryl type, crosslinked with a conventional dialkenyl crosslinking agent in amount up to eight mole percent, total monomers basis. The beads are advantageously surface sulfonated or treated with a wetting agent to permit readier wetting and extraction of iodine from its aqueous solutions, although such pretreatment is not strictly necessary. Thus, the polymeric bead matrixes (base resins) are conventional polymers of styrene, o-, m- and p-methylstyrene, o-, m- and p-ethylstyrene, α-methylstyrene, p-methylstyrene, vinylnaphthalene, vinylanthracene, their homologs or mixtures, crosslinked with between about 0.1 and 8 mole percent, total monomers basis, of a conventional crosslinking agent having two alkenyl groups, e.g., divinylbenzene, divinyltoluene, divinylxylene, divinylethylbenzene, divinylnaphthalene, diacrylate esters, dimethacrylate esters, diallyl esters, alkylidene bis-acrylamides, etc.

The polymeric vinylaryl resin beads are advantageously surface sulfonated in amount sufficient to give an ion exchange capacity of 0.001 to 0.1 meq. of hydrogen per gram of dry resin when titrated with one-tenth-normal caustic soda. This is accomplished in one way by pouring one weight part of polymeric vinylaryl resin beads into 2.76 weight parts of concentrated sulfuric acid having a specific gravity of 1.84, maintained at a temperature of about 90° C., and allowing sulfonation to proceed for ca. 15 minutes with stirring. The acid is then removed from the resin beads by a vacuum filtration, after which residual acid is removed with a water rinse. Alternatively, a procedure as described in U.S. Patent 2,500,149 may be used, wherein lower temperatures and proportions of sulfuric acid to resin beads such as to give surface sulfonated products having a capacity as indicated are utilized. The sulfonated resin beads are useful in the hydrogen and alkali metal or ammonium salt forms.

Alternatively, the polymeric vinylaryl resin beads are advantageously wetted with a dilute, ca. 0.1–10 weight percent, aqueous solution of a wetting agent. By "wetting agent" is meant an alkyl aryl sulfonate, having the typical structure $C_{12}H_{25}$—$C_6H_4$—$SO_3Na$; 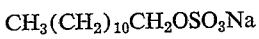 a fatty alkyl sulfate, having the typical structure $$CH_3(CH_2)_{10}CH_2OSO_3Na$$

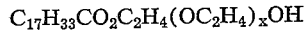
a nonionic ester, having the typical structure $$C_{17}H_{33}CO_2C_2H_4(OC_2H_4)_xOH$$

a nonionic ether, having the typical structure $$C_8H_{17}—C_6H_4—OC_2H_4(OC_2H_4)_xOH$$

a sulfonated fatty amide, having the typical structure $C_{17}H_{33}CON(CH_3)C_2H_4SO_3Na$; a fatty amide-ethylene oxide condensate, having the typical formula $$C_{11}H_{23}CON(C_2H_4OH)_2$$

or a cationic, having the typical formula $$C_{12}H_{25}(C_6H_5CH_2—)(CH_3)_2N^+Cl^-$$

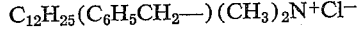

Advantageously, the resin beads are treated by immersion in an aqueous solution of the wetting agent, followed by draining or by passing aqueous wetting solution through a bed of the resin beads. Also, tetrahydronaphthalene-swollen resin beads can be similarly treated with aqueous wetting agent.

The surface-sulfonated or wetting agent-wetted resin beads or the resin beads per se are swollen in tetrahydronaphthalene to the gel state by equilibration in excess tetrahydronaphthalene, advantageously by heating therein on a steam bath for one hour. An increase in volume of about 300 percent results when 2 percent crosslinked surface-sulfonated resin beads are fully swollen by tetrahydronaphthalene. Prior to use, the beads are filtered from excess tetrahydronaphthalene, rinsed with any aqueous detergent, advantageously an aqueous solution of a sulfonate detergent such as one percent alkyl aryl sulfonate to remove surface tetrahydronaphthalene, and finally rinsed with several bed volumes of water.

The above-described tetrahydronaphthalene-swollen resin beads sorb elemental iodine from aqueous solutions thereof which may also contain one or more alkali metal, alkaline earth metal and ammonium salts of inorganic acids. However, as the concentration of alkaline earth salts of inorganic acids increases, the iodine in solution is less efficiently sorbed. The same is true of increasing proportions of chloride concentration. For economic reasons, an upper limit of about 10 weight percent of one or more alkali metal, alkaline earth metal or ammonium salts of inorganic acids should be maintained.

The elemental iodine is eluted from the iodine-loaded tetrahydronaphthalene-swollen resin beads with a chemical solvent, i.e., an aqueous solution of a water-soluble alkali metal, ammonium or alkaline earth metal hydroxide, whereby the iodine is reduced to an iodide of alkali metal, alkaline earth metal or ammonium. Alternatively, tetrahydronaphthalene may be used to elute the iodine, whereby a solution of elemental iodine in tetrahydronaphthalene is obtained.

In practice, an aqueous solution of elemental iodine which may contain one or more alkali metal, alkaline earth metal or ammonium salts of inorganic acids is fed to a bed of tetrahydronaphthalene-swollen resin beads, as described above, until initial breakthrough. This may be determined by visual observation, i.e., the red color of the iodine as it is absorbed by the tetrahydronaphthalene-swollen resin gel phase. Alternative methods of checking the iodine breakthrough include direct titration of resin bed effluent with sodium thiosulfate to a starch end point, total iodine by the well-known bromine oxidation method using thiosulfate, or a spectrographic method using tetralin as an extractant and directly reading the percent iodine. The feed is stopped at breakthrough or just before breakthrough and the feed solution drained to bed level. The iodine-loaded resin column is eluted or stripped of iodine by feeding aqueous sodium hydroxide thereto, advantageously one-normal sodium hydroxide and advantageously at a rate of ca. 0.6 gal./min./ft.$^2$ resin bed cross-sectional area. Product effluent is collected as a series of small cuts and is analyzed for iodine, advantageously by the bromine oxidation method.

The following examples describe completely representative specific embodiments of the invention herein and the best mode contemplated by the inventor of carrying out his invention. They are not to be considered as limiting the invention other than as defined in the claims.

EXAMPLE 1

A quantity of 50 grams of resinous 2 percent divinylbenzene-98 percent styrene copolymer beads (30–40 U.S. mesh) was poured into 150 ml. of 1.84 specific gravity sulfuric acid previously heated to ca. 92° C. The reaction was allowed to continue for 15 minutes with stirring. The surface-sulfonated beads were removed from the acid by filtration after which the beads were water washed. The beads were then oven dried at 110° C. for several hours. Titration of a small quantity of the dried beads with caustic soda indicated an ion exchange capacity of 0.0042 meq./ml.

A quantity of 66 ml. of the above-prepared copolymer beads was contacted with excess tetrahydronaphthalene on a steam bath. The final volume of tetrahydronaphthalene-swollen copolymer was 218 ml. or a 330 percent volume increase. The excess tetrahydronaphthalene was drained off and the beads were washed with several bed volumes of aqueous detergent solution, followed by several bed volumes of water.

A 50 ml. glass burette containing a stainless steel screen in the bottom was half filled with surface-sulfonated tetrahydronaphthalene-swollen copolymer beads, as described above. The burette column was water filled and backwashed to classify the beads. The water was drained to the level of the resin bed.

A feed solution was prepared by mixing two solutions. One solution contained KI at a concentration of 0.21 gram per liter iodine, 0.27 gram per liter NaCl, and was made slightly basic with sodium hydroxide. The second solution contained KIO$_3$ at a concentration of 0.042 gram per liter iodine, 0.27 gram per liter NaCl and was made acidic with H$_2$SO$_4$. These two solutions were mixed in equal volumes using an in-line stirred mixer to give a final feed solution containing 125 p.p.m. iodine and a slight excess of acid. This mixture was the solution fed to the resin bed.

The feed solution was pumped to the column at a rate of 14 ml./min., a flow rate equal to 4.5 gal./min./ft.$^2$ resin bed cross-sectional area. The effluent from the column was taken as a series of 250 ml. cuts. The effluent cuts were checked for iodine by a spectrographic method using tetrahydronaphthalene as an extractant and directly reading the percent iodine.

The total volume and analysis of the effluent cuts were as noted below. The breakthrough of iodine could be followed visually by the red color of the iodine as it was absorbed by the tetrahydronaphthalene-swollen resin gel phase.

Table I

| Total Effluent Vol. (Mls.) | P.p.m. I$_2$ | Total Effluent Vol. (Mls.) | P.p.m. I$_2$ | Total Effluent Vol. (Mls.) | P.p.m. I$_2$ |
|---|---|---|---|---|---|
| 9,000 | nil | 12,000 | 45 | 14,250 | 94 |
| 9,250 | 10 | 12,250 | 48 | 14,500 | 98 |
| 10,000 | 12 | 12,500 | 50 | 14,750 | 102 |
| 10,500 | 18 | 12,750 | 63 | 15,000 | 107 |
| 10,750 | 22 | 13,000 | 57 | 15,250 | 110 |
| 11,000 | 24 | 13,250 | 68 | 15,500 | 112 |
| 11,250 | 28 | 13,500 | 77 | 15,750 | 116 |
| 11,500 | 38 | 13,750 | 83 | | |
| 11,750 | 38 | 14,000 | 88 | | |

The feed was stopped and the solution was drained to bed level again. If it is assumed that the midpoint was at 13,100 ml. of feed having 125 p.p.m. iodine, then 1.63 grams iodine was loaded on the resin bed.

To elute or strip the column, one-normal NaOH was fed to the column at a rate of 2 ml./min. The product effluent was collected as a series of small cuts and analyzed for iodine by the bromine oxidation method. The analysis and cut volumes were as follows:

Table II

| Cut No. | Vol. of Cut, ml. | Gram Iodine/Cut |
|---|---|---|
| 1 | 5.0 | nil |
| 2 | 4.9 | nil |
| 3 | 4.7 | .053 |
| 4 | 5.3 | .710 |
| 5 | 5.3 | .830 |
| 6 | 5.4 | .044 |
| 7 | 9.2 | nil |
| Total | | 1.637 |

The combining of product cuts 3, 4, 5 and 6 indicated 1.64 grams iodine in a volume of 20.7 ml., or an average of 8.2 percent iodine with a maximum in cut 5 of 15.7 percent iodine.

The ease of elution with one-normal caustic soda is noteworthy. As shown above, 93 percent of the iodine was found in cuts 4 and 5. The high iodine product concentration compensates for the lower iodine loading when comparing this method to ion exchange.

When the procedure described above is repeated with similar tetralin-swollen resin beads crosslinked with at least 0.1 and up to 8 mole percent of other conventional crosslinking agents, substantially similar results are obtained. However, the lower the crosslinking of the resin beads, the greater is the amount of tetralin sorbed by the resin beads.

EXAMPLE 2

A quantity of dry, spherical, 30–50 U.S. mesh, 2 percent divinylbenzene-98 percent styrene copolymer beads was swollen by equilibrating with tetrahydronaphthalene. The copolymer bulk volume increased from 107 ml. to 360 ml. Fifteen ml. of the tetrahydronaphthalene-swollen copolymer beads was slurried with tetrahydronaphthalene into a one-half inch inside diameter glass column. The copolymer was supported in the column by a fritted glass disc. An aqueous one weight percent detergent solution, sodium dodecylbenzene sulfonate, was run through the copolymer bed in the column, followed by a water rinse.

Iodine feed solution for the so-prepared resin bed column was prepared by adding iodine crystals to a closed vessel containing deionized water and allowing the system to equilibrate. The iodine concentration of the feed solution varied from 300 p.p.m. to 340 p.p.m. during the run. When iodine feed solution was passed through the resin bed, iodine was first detected in the effluent at 10 p.p.m. when 2390 ml. of feed had passed through the resin bed. The flow rate was 6 ml./min. The concentration of iodine in the effluent was 40 p.p.m. at 3488 ml. of feed, 90 p.p.m. at 4158 ml. of feed and 210 p.p.m. at 6898 ml. of feed. The loading of the resin bed was discontinued at this time. The total quantity of iodine fed to the copolymer bed was approximately 2.1 grams.

Elution of the iodine was accomplished by draining the resin bed of feed solution and feeding a one-normal NaOH solution to the column at a flow rate of 2 ml./min. The initial effluent was very dark and contained elemental iodine as well as sodium iodide. This dark portion of the effluent was collected as two fractions. The first fraction, 9.8 ml. in volume, contained 41 grams per liter iodine; the second fraction, 6.4 ml. in volume, contained 146 grams per liter of iodine. The effluent then became colorless and the following fractional volumes and iodine analyses were obtained: third fraction, 10.4 ml., 6.2 grams per liter; fourth fraction, 10.0 ml., 0.38 gram per liter; fifth fraction, 10.0 ml., 0.115 gram per liter; sixth fraction, 9.8 ml., 0.06 gram per liter; seventh fraction, 50.0 ml., <0.010 gram per liter. Thus, 95 percent of the eluted iodine was contained in the first 16.2 ml. of effluent from the column. The iodine concentration in this first portion of effluent was 260 times that of the feed solution.

EXAMPLE 3

A quantity of dry, spherical, 50–80 U.S. mesh, styrene-divinylbenzene, resinous copolymer beads was equilibrated with tetrahydronaphthalene. The bulk volume of the copolymer beads, which contained one percent divinylbenzene as the crosslinking agent, increased somewhat more than 500 percent after being swollen with tetrahydronaphthalene. Fifteen ml. of the tetrahydronaphthalene-swollen beads was transferred to a one-half inch inside diameter glass column. The excess tetrahydronaphthalene was drained to the level of the copolymer beads. An aqueous solution of iodine was then fed to the column. The iodine feed solution was prepared by simple equilibration of excess iodine crystals with deionized water. The iodine concentration of the solution varied from 328 to 372 p.p.m. during the loading, which was accomplished at a flow rate of 4 ml./min. The effluent from the column was collected as a series of cuts. The iodine concentration of the first portion of the effluent was 35 p.p.m. and this level continued for 3750 ml. of total effluent volume. At an effluent volume of 4800 ml., the iodine concentration was 53 p.p.m., at 5928 ml. effluent volume, the iodine concentration was 98 p.p.m. and at an effluent volume of 7176 ml., the iodine concentration was 177 p.p.m. When the total volume of feed solution through the column reached 8864 ml. and the effluent iodine concentration was 213 p.p.m., the loading was stopped.

Elution of the iodine with one-normal NaOH solution followed the procedure of Example 2. The elution effluent from the column was collected in four cuts. The following values indicate that 98 percent of the eluted iodine was contained in the second cut. Analysis for iodine in all cases was by means of sodium thiosulfate titration.

*Table III*

| Cut No. | Cut Vol., ml. | Total Vol., ml. | $I_2$, mg. Per Cut | $I_2$, mg. Per Liter |
|---|---|---|---|---|
| 1 | 5.1 | 5.1 | 1.7 | 330 |
| 2 | 16.5 | 21.6 | 1,850.0 | 112,000 |
| 3 | 9.9 | 31.5 | 17.5 | 1,770 |
| 4 | 51.0 | 82.5 | 20.0 | 390 |

What is claimed is:

1. Method for removing elemental iodine from an aqueous solution thereof
    by feeding said solution to a bed of polymeric vinylaryl resin beads, crosslinked with 0.1 to 8 mole percent of a dialkenyl crosslinking agent,
    selected from the group consisting of such resin beads per se,
    those which are surface sulfonated to an ion exchange capacity of ca. 0.001 to 0.1 milleequivalent of hydrogen per gram of dry resin
    and those which are surface wetted with aqueous wetting agent,
        swollen to the gel state by equilibration with tetrahydronaphthalene,
            whereby elemental iodine is sorbed by said tetrahydronaphthalene-swollen resin beads and removing the sorbed iodine therefrom.
2. Method of claim 1
    wherein the iodine is removed from the tetralin-swollen resin phase by aqueous sodium hydroxide as sodium iodide.
3. Method of claim 1
    wherein the resin is crosslinked with 2 mole percent divinylbenzene.

References Cited by the Examiner

UNITED STATES PATENTS

| | | | |
|---|---|---|---|
| 2,233,787 | 3/1941 | Gloahec et al. | 23—89 |
| 2,500,149 | 3/1950 | Boyer | 260—2.2 |
| 2,898,311 | 8/1959 | Tsunoda et al. | 260—2.2 |
| 3,050,369 | 8/1962 | Mills | 23—216 |

OTHER REFERENCES

"The Condensed Chemical Dictionary," page 1124 (Sixth Edition), 1961. Reinhold Pub. Corp., New York, QD 5, C5, 1961 C8.

MAURICE A. BRINDISI, *Primary Examiner.*

GEORGE D. MITCHELL, *Examiner.*